Nov. 22, 1966  R. T. DOUGLAS ET AL  3,286,960
COMPRESSOR MOUNTING SPRING
Filed June 1, 1964

INVENTORS
RICHARD T. DOUGLAS AND
BY RONALD R. WISNER

Dale A. Winnie
ATTORNEY

United States Patent Office 3,286,960
Patented Nov. 22, 1966

3,286,960
COMPRESSOR MOUNTING SPRING
Richard T. Douglas, Farmington, and Ronald R. Wisner, Garden City, Mich., assignors to American Motors Corporation, Detroit, Mich., a corporation of Maryland
Filed June 1, 1964, Ser. No. 371,521
5 Claims. (Cl. 248—20)

This invention relates to motor-compressor units in general and more particularly to means of mounting such apparatus within a suitable housing.

It is quite common to mount a motor-compressor unit on helical wound springs within a housing that is otherwise secured to a supporting structure.

The matter of proper and essentially vibration-free support is particularly important for hermetically sealed motor-compressor units used with refrigerators, air conditioners and the like. These units must be as trouble free as possible and provide the longest possible serviceable life.

Helical compression springs are used quite commonly for mounting motor-compressor units in refrigeration apparatus; both for support and as vibration insulators. In some instances the springs may be in tension but more often they are in compression. Generally, the springs are used to support and isolate the motor-compressor unit from the inside of an enclosing shell or housing. They normally include evenly spaced coils permissive of both axial and lateral deflection and responsive to forces and movements applied from any and all directions.

Unfortunately, the lateral rate of open and evenly spaced coil springs is usually higher than their axial rate. This causes problems in dissipating and isolating torsional vibrations which are most prevalent during starting and stopping.

A further problem is mounting the springs themselves. The compression springs usually have their ends received in pockets or fitted over posts for due retention. The spaced coils require either rather long posts or posts which are threaded to enable the coils to be wound thereon so that adequate support is obtained. In the first instance this makes it difficult to obtain a compact assembly and in the other instance the material and labor cost is greater.

It is an object of this invention to provide a suspension system for motor-compressor units and the like and which include compression springs having a controlled lateral to axial spring rate ratio.

It is an object of this invention to provide a suspension system for motor-compressor units and the like which make use of helical wound compression springs disposed in axially parallel alignment with the drive shaft of the unit and having a lower lateral spring rate, than axial rate, for greater isolation of torsional vibration forces.

It is an object of this invention to provide a suspension system which makes use of helical wound compression springs having close wound coils at both ends and spaced coils intermediate the ends thereof.

It is an object of this invention to provide a suspension system which makes use of compression springs with close wound coils at each end to facilitate mounting.

It is an object of this invention to provide a suspension system which makes use of compression springs of the type last mentioned and which have some of the close wound coils at one end extended beyond its support for actively affecting the lateral spring rate thereof.

These and other objects and advantages to be gained in the practice of this invention will be better understood and more fully appreciated upon reading the following specification having reference to the accompanying drawing wherein.

Figure 1:
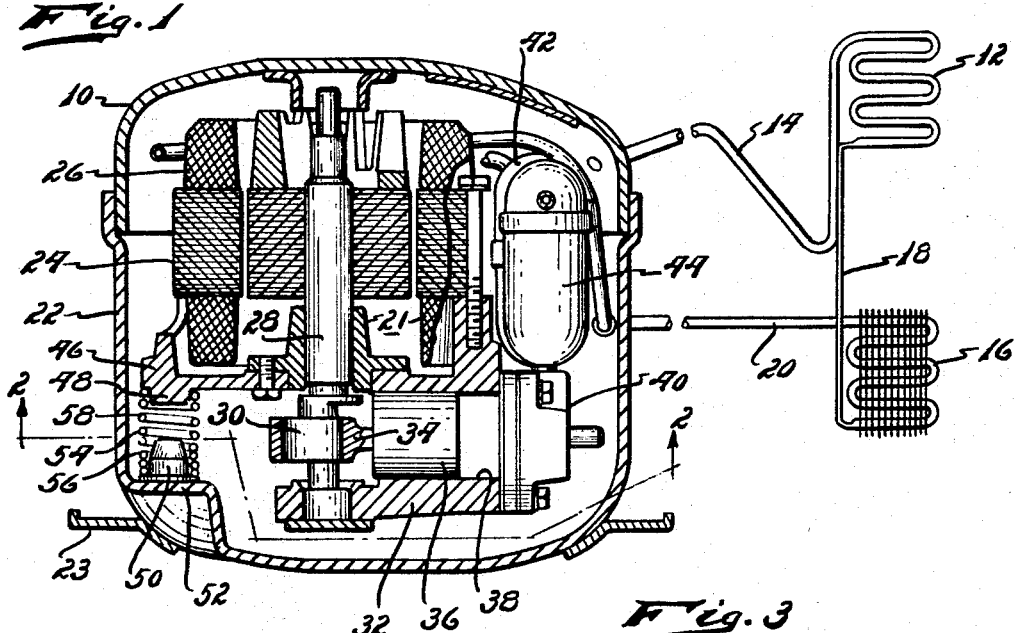
FIGURE 1 is a cross sectional view of a motor-compressor unit for use in a refrigeration system and showing parts of such a refrigeration system schematically.

The compressor assembly 10 is a hermetically sealed unit such as is used principally for refrigeration apparatus. It is connected to a condenser 16 by a refrigerant transfer line 20 and hence to an evaporator 12 by a capillary tube 18. The evaporator is in turn connected back to the compressor assembly by a return line 14.

The compressor assembly 10 includes a motor-compressor unit 21 which is provided within housing shell 22 and is in turn connected by base supporting brackets 23 to other structural support means. Within the housing shell 22 is provided an electrical motor 24 including windings 26 and having a shaft 28 with an eccentric journal 30 near one end thereof. The refrigerant compressor 32 includes a pump having a connecting rod 34 connected to the eccentric journal 30 of the crankshaft 28 and a piston 36 which is received within a cylinder bore 38 where the refrigerant is compressed. The cylinder bore 38 is closed by a cylinder head 40 which includes suitable passages (not shown) and has intake and discharge mufflers 44 and 42 connected thereto.

Since the motor-compressor unit 21 itself comprises no part of this invention it need not be described in further detail.

A casting 46 is provided on the motor-compressor unit 21 and is formed to include tri-pod spaced projections 48 which depend from the underside thereof. Such spaced projections 48 mate with like projections or posts 50 which are spot welded or otherwise provided on supporting shelves 52 formed in the housing shell 22.

The motor-compressor unit 21 is supported on mounting springs 54. These are engaged on the projections 48 which extend below the casting 46 and on the posts 50 provided within the housing shell 22. The springs include close wound turns or coils 56 at one end, a plurality of spaced turns 58 and more close wound turns 60 at the other end.

It will be noted that the close wound coils 56 and 60 at opposite ends of the springs fit over and about the posts 48 and 50 on the compressor casting 46 and in the housing shell 22, respectively. In practice the projections or posts are formed with a slight taper so that they receive the springs easier and have an interference and press fitted engagement therewith.

The close wound turns at opposite ends of the springs provide a cylindrical collar-like part at each end of the springs which greatly facilitates the assembly of the springs on the receptive projections or posts 48 and 50. It will be appreciated that the close winding makes the springs shorter and thus fore-shortens the whole assembly and makes a much more compact arrangement possible.

Figure 3:
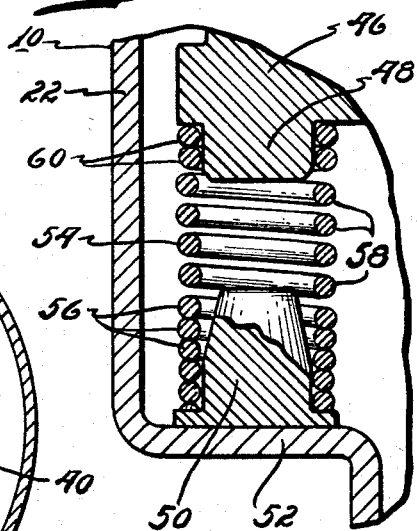
FIG. 3 is an enlarged fragmentary and cross section detail of the compressor unit shown by the first drawing figure and having particular reference to the compression spring of the suspension means used therewith.
Figure 2:
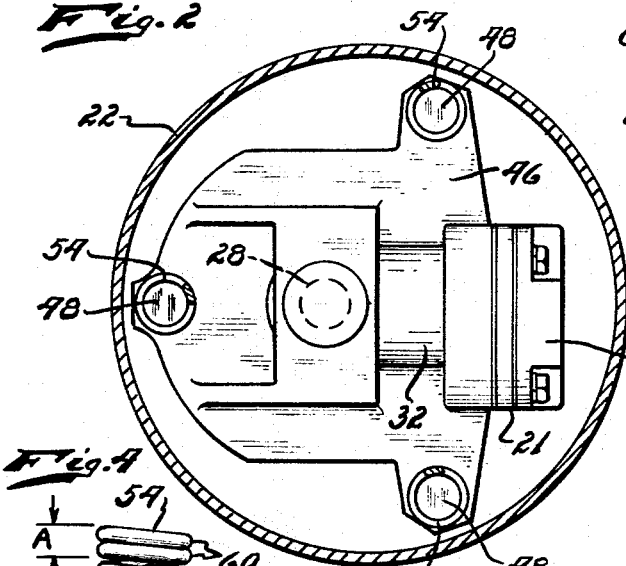
FIG. 2 is a bottom end view of the motor-compressor unit shown by the first drawing figure as seen substantially in the stepped plane of line 2—2 thereon and looking in the direction of the arrows.
Figure 4:
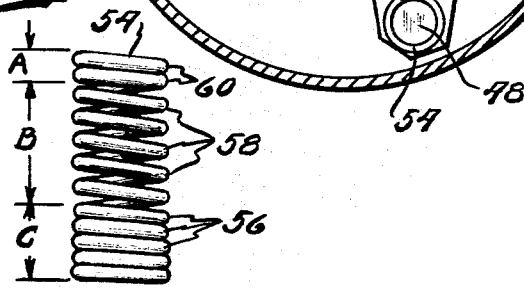
FIG. 4 is a detailed drawing of one of the compression springs used to provide the suspension system for the motor-compressor unit shown by the other drawing figures.

Referring to FIGURES 3 and 4;

It will be noted that the number of close wound turns 56 at one end of the springs 54 exceed the number of close wound turns, identified as 60, at the other end thereof. FIGURE 4, in particular, shows that the close wound turns C are more in number and extended further in length than the close wound turns A. The number of close wound turns at the one end exceeds those needed for retention of the spring on one of the spring posts 50 and results in some of the close wound turns 56 extending beyond the spring posts and being actively disposed to resist lateral movement of the motor-compressor unit.

Obviously, the spaced turns 58, or B in FIGURE 4, are active in resisting both axial and lateral movement of the motor-compressor unit. The close wound coils, on the other hand, are inactive in compression but are virtually as active in the lateral direction as the spaced coils. This results in a relatively low lateral spring rate in comparison to the axial rate and is highly desirable with the vertical shaft arrangement shown since the weight of the pump assembly is supported by the springs in an axial direction and the greatest mode of vibration is in torsion about the drive shaft 28.

From the foregoing it will be appreciated that a new and different suspension system is provided and one in which the axial and lateral spring rates may be varied and related to each other to provide a relatively reasonable ratio of axial to lateral stiffness in the use of helical wound springs in a suspension system. More particularly, the use of close wound coils or turns at the end of helical wound compression springs has the advantage of providing better means of support on spring posts, or the like, and variable axial and lateral spring rates by the number of active close wound and spaced turns or coils provided in a given suspension spring member.

Although a specific embodiment of this invention has been shown and disclosed, it will be appreciated that certain modifications and improvements are within the spirit and scope thereof. Accordingly, such modifications and improvements as are not specifically excluded by the language of the hereinafter appended claims are to be considered as inclusive thereunder.

We claim:
1. Refrigeration apparatus including means for resiliently supporting a motor-compressor unit for the isolation of vibrational forces incident to the operation thereof, and comprising:
a plurality of compression springs having axial and lateral resilience,
means receiving and disposing said springs in axially parallel alignment with the crankshaft of the motor-compressor unit supported thereby,
said springs each including helical wound coils having close wound turns provided at one end and spaced turns providing intermediate the ends thereof,
and the ratio of active close wound and spaced turns providing a relatively low lateral to axial spring rate.

2. Refrigeration apparatus including means for resiliently supporting a motor-compressor unit for the isolation of vibrational forces incident to the operation thereof, and comprising:
a plurality of compression springs having axial and lateral resilience,
means receiving and disposing said springs in axially parallel alignment with the crankshaft of the motor-compressor unit supported thereby,
said springs each including helical wound coils having close wound turns provided at both ends thereof and spaced turns provided intermediate said ends,
said close wound turns at one end of said springs having part thereof laterally active,
and the ratio of said active close wound turns to said spaced turns providing a relatively low lateral to axial spring rate.

3. The refrigerator apparatus and motor-compressor supporting means of claims 2, said close wound turns providing foreshortened means for the engagement of the ends of said springs on said spring receiving means and having some of the close wound turns at one end thereof extended therebeyond, and said extended close wound turns being active in providing a relatively low lateral to axial spring rate.

4. The refrigerator apparatus and motor-compressor supporting means of claim 3, said close wound turns and said spring receiving means being cooperatively formed and tapered for press fitted locking engagement therebetween.

5. The refrigerator apparatus and motor-compressor supporting means of claim 3, said spring receiving means being tapered within at least part of said close wound turns to allow for the limited lateral movement afforded by said close wound turns.

References Cited by the Examiner

UNITED STATES PATENTS

| | | | |
|---|---|---|---|
| 2,852,258 | 8/1958 | Dunklee et al. | 272—66 |
| 3,030,056 | 4/1962 | Rogers | 248—20 |
| 3,058,705 | 10/1962 | Hagg et al. | 248—20 |

FOREIGN PATENTS 584,498  1/1947  Great Britain.

CLAUDE A. LE ROY, *Primary Examiner.*

J. F. FOSS, *Assistant Examiner.*